US010444968B2

(12) United States Patent
Yoshinaka

(10) Patent No.: US 10,444,968 B2
(45) Date of Patent: Oct. 15, 2019

(54) DISPLAY CONTROL DEVICE, DISPLAY CONTROL METHOD, AND PROGRAM

(71) Applicant: Sony Corporation, Tokyo (JP)

(72) Inventor: Kei Yoshinaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/946,778

(22) Filed: Apr. 6, 2018

(65) Prior Publication Data
US 2018/0225035 A1   Aug. 9, 2018

Related U.S. Application Data

(63) Continuation of application No. 15/263,416, filed on Sep. 13, 2016, now Pat. No. 9,977,586, which is a continuation of application No. 14/884,855, filed on Oct. 16, 2015, now Pat. No. 9,483,857, which is a continuation of application No. 13/480,241, filed on May 24, 2012, now Pat. No. 9,189,148.

(30) Foreign Application Priority Data

Jun. 3, 2011   (JP) .................................. 2011-125417

(51) Int. Cl.
G06F 3/0484    (2013.01)
G06F 3/0488    (2013.01)
G06T 3/40      (2006.01)
G06T 11/60     (2006.01)
G11B 27/34     (2006.01)

(52) U.S. Cl.
CPC ...... G06F 3/04847 (2013.01); G06F 3/04842 (2013.01); G06F 3/04845 (2013.01); G06F 3/04883 (2013.01); G06T 3/40 (2013.01); G06T 11/60 (2013.01); G11B 27/34 (2013.01); G06F 2203/04806 (2013.01); G06F 2203/04808 (2013.01)

(58) Field of Classification Search
None
See application file for complete search history.

(56) References Cited

U.S. PATENT DOCUMENTS 5,884,056 A * 3/1999 Steele ................ H04N 7/17318
                                                    715/738
2003/0184667 A1  10/2003 Aoyama
2007/0189737 A1   8/2007 Chaudhri
2009/0046139 A1   2/2009 Cutler
(Continued)

FOREIGN PATENT DOCUMENTS

JP      7-21403      1/1995
JP    2003-283888   10/2003
(Continued)

Primary Examiner — James A Thompson
(74) Attorney, Agent, or Firm — Haug Partners LLP; Williams S. Frommer

(57) ABSTRACT

There is provided a display control device including an operation detection unit configured to detect an enlargement operation on any image displayed within a display screen among a plurality of images having a predetermined relation, and a display control unit configured to determine a display area of the image based on the detected enlargement operation and to cause a portion corresponding to the display area to be enlarged and displayed for each of the images displayed within the display screen.

12 Claims, 15 Drawing Sheets

(56) References Cited

U.S. PATENT DOCUMENTS

| | | | |
|---|---|---|---|
| 2009/0288011 | A1 | 11/2009 | Piran et al. |
| 2010/0095206 | A1* | 4/2010 | Kim .................. G06F 3/017 |
| | | | 715/702 |
| 2010/0194703 | A1* | 8/2010 | Fedor ................ G06Q 30/02 |
| | | | 345/173 |
| 2010/0328494 | A1 | 12/2010 | Kim |
| 2012/0036466 | A1 | 2/2012 | Venon |
| 2012/0079416 | A1 | 3/2012 | Fagans |
| 2012/0210200 | A1* | 8/2012 | Berger .............. G06F 3/0481 |
| | | | 715/202 |
| 2013/0016122 | A1* | 1/2013 | Bhatt .............. G06F 3/04845 |
| | | | 345/620 |

FOREIGN PATENT DOCUMENTS

| | | |
|---|---|---|
| JP | 2004-104373 | 4/2004 |
| JP | 2010-283538 | 12/2010 |

* cited by examiner

● TOUCH POINT
(OPERATION LOCATION)

● TOUCH POINT

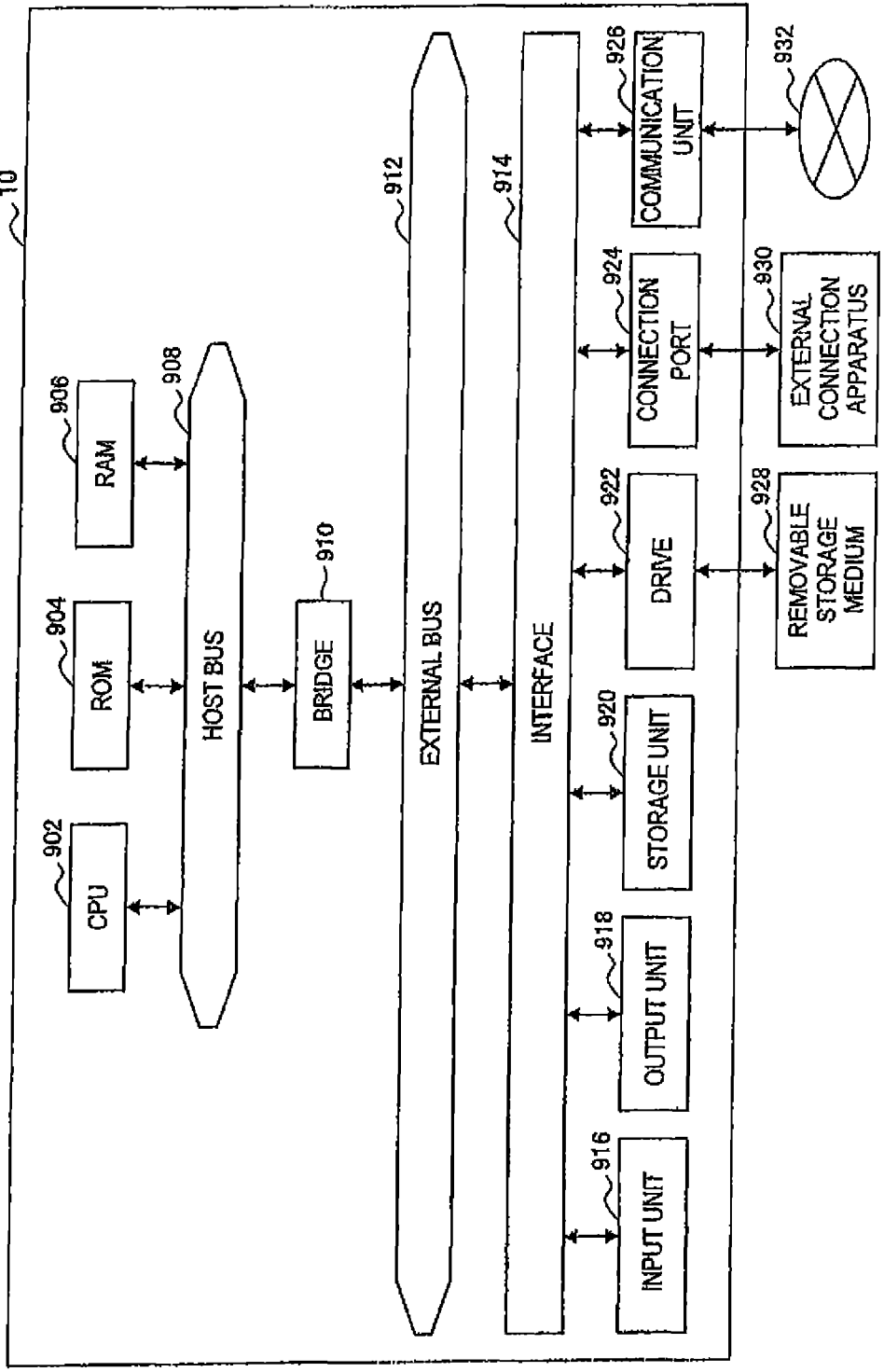

DISPLAY CONTROL DEVICE, DISPLAY CONTROL METHOD, AND PROGRAM

This is a continuation of application Ser. No. 15/263,416, filed Sep. 13, 2016, which is a continuation of application Ser. No. 14/884,855, filed Oct. 16, 2015, now U.S. Pat. No. 9,483,857, issued Nov. 1, 2016, which is a continuation of application Ser. No. 13/480,241, filed May 24, 2012, now U.S. Pat. No. 9,189,148, issued Nov. 17, 2015, which is entitled to the priority filing date of Japanese application serial number 2011-125417, filed Jun. 3, 2011, the entirety of which is incorporated herein by reference.

BACKGROUND

The present disclosure relates to a display control device, a display control method, and a program.

For example, applications displaying images corresponding to reproduction locations of moving image content as thumbnail images in time-series are disclosed. Users can select one image of a plurality of images arranged to reproduce the content from the reproduction location corresponding to the selected thumbnail image (e.g., see Japanese Laid-Open Patent Publication No. 2004-104373).

SUMMARY

A method of enabling users to efficiently understand the contents of an image in a scene in which the desired image is selected among the plurality of images has been demanded. The present technology thus proposes a display control device, a display control method, and a program through which the contents of a plurality of images can be efficiently understood.

According to an embodiment of the present technology, there is provided a display control device, which includes an operation detection unit configured to detect an enlargement operation on any image displayed within a display screen among a plurality of images having a predetermined relation; and a display control unit configured to determine a display area of the image based on the detected enlargement operation and to cause a portion corresponding to the display area to be enlarged and displayed for each of the images displayed within the display screen.

According to another embodiment of the present technology, there is provided a display control method, which includes detecting an enlargement operation on any image displayed within a display screen among a plurality of images having a predetermined relation; and determining a display area of the image based on the detected enlargement operation, and causing a portion corresponding to the display area to be enlarged and displayed for each of the images displayed within the display screen.

According to still another embodiment of the present technology, there is provided a program causing a computer to act as a display control device, which includes an operation detection unit configured to detect an enlargement operation on any image displayed within a display screen among a plurality of images having a predetermined relation; and a display control unit configured to determine a display area of the image based on the detected enlargement operation and to cause a portion corresponding to the display area to be enlarged and displayed for each of the images displayed within the display screen.

According to the embodiments of the present technology described above, a display control device, a display control method, and a program through which the contents of a plurality of images can be efficiently understood are provided.

BRIEF DESCRIPTION OF THE DRAWINGS

FIG. 18 is a diagram illustrating an example of hardware configurations of a display control device according to the first and second embodiments of the present technology.

DETAILED DESCRIPTION OF THE EMBODIMENT(S)

Figure 1:
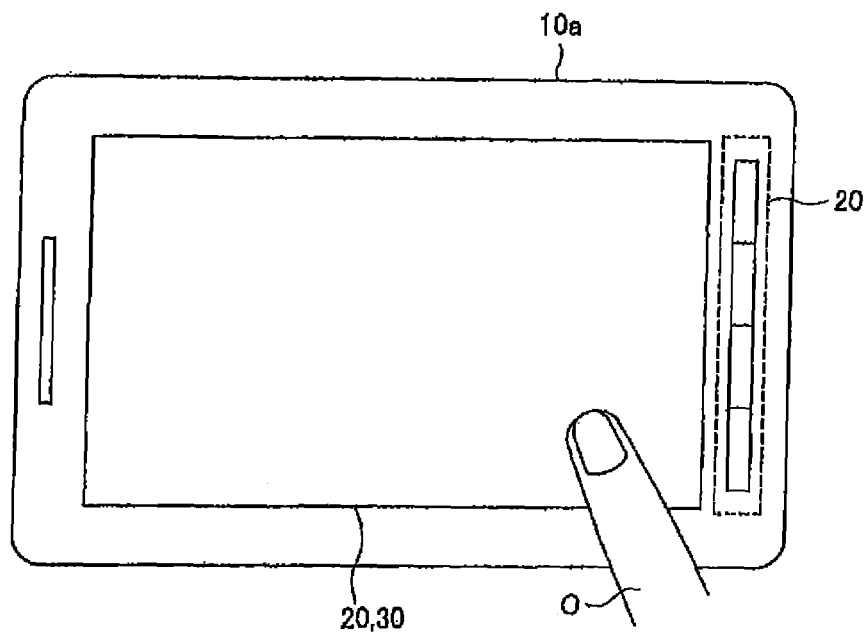
FIG. 1 is an appearance diagram illustrating a display control device according to a first embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description is made in the following order.
1. First embodiment (example of display control device based on input operation from touch sensor)
   1-1. Functional configuration
   1-2. Display control
2. Second embodiment (example of display control device based on input operation from external input device)
3. Hardware configuration example

1. First Embodiments (1-1. Configuration)

Figure 2:
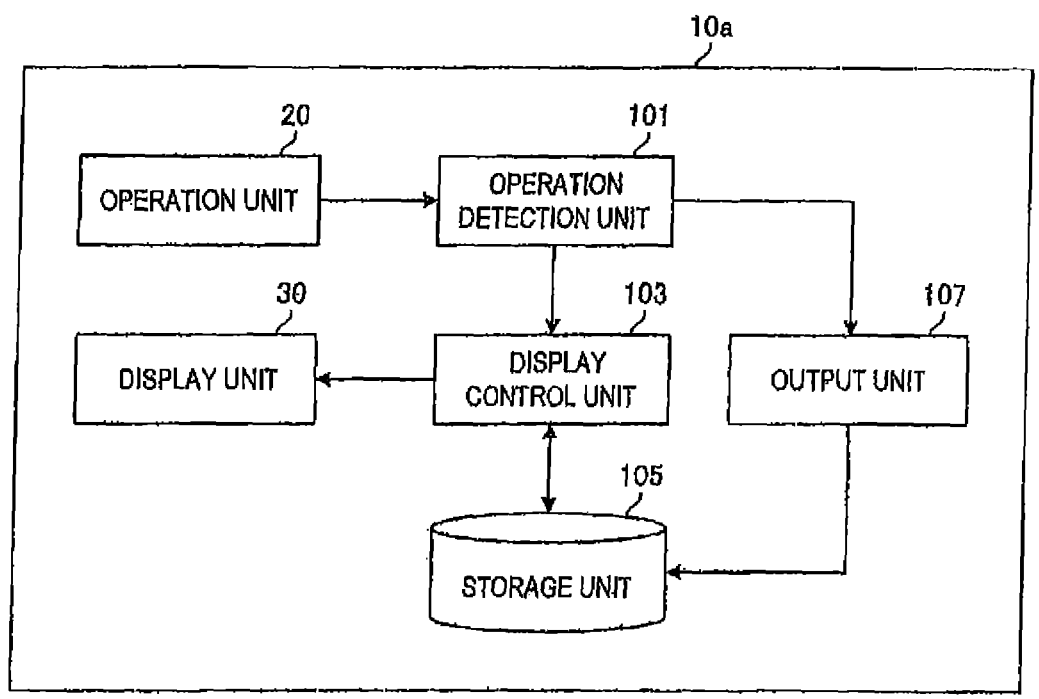
FIG. 2 is a functional diagram illustrating a display control device according to the first embodiment.

First, a configuration of a display control device according to the first embodiment of the present technology will be described with reference to FIGS. 1 and 2. FIG. 1 is an appearance diagram illustrating a display control device according to a first embodiment of the present technology. FIG. 2 is a functional diagram illustrating a display control device according to the first embodiment.

The display control device 10a according to the first embodiment of the present technology is an information processing device that enables an input operation to be carried out using a touch sensor. The display control device 10a may be, for example, not only a cellular phone but also an information processing device such as a portable music reproducing device, a portable moving image processing device, a portable game machine, a personal computer (PC), a personal handyphone system (PHS), and a personal digital assistant (PDA).

A display unit 30 is disposed on a surface of the display control device 10a. An operation unit 20 using a touch sensor and overlapping the display unit 30 is then disposed. The display control device 10a may also have an operation unit 20 using buttons separate from the touch sensor. Users may perform operations on a display screen displayed in the display unit 30 to input desired operation information to the display control device 10a. In addition, the display control device 10a may control the contents of the display screen based on the input operation information. The display control device 10a may control the displayed contents using a so-called graphical user interface (GUI).

When the user carries out the input operation using the touch sensor, the user may operate the display screen displayed on the display unit 30 by an operating body O to input the operation information. The operating body O may be a finger of the user, for example. Alternatively, the operating body O may be a stylus.

Next, referring to FIG. 2, the display control device 10a mainly includes an operation unit 20, a display unit 30, an operation detection unit 101, a display control unit 103, a storage unit 105, and an output unit 107.

The operation unit 20 may be configured to include, for example, operation means for causing the user to input information such as a touch sensor, buttons, a mouse, and a lever, an input control circuit generating an input signal based on the user operation and outputting the input signal to the operation detection unit 101, and so forth. The display control device 10a is a device that has at least the operation unit 20 using the touch sensor. The touch sensor used herein is a contact type touch sensor detecting a location of the operating body O in contact with the screen. Alternatively, the touch sensor used herein may be a non contact type touch sensor detecting a location of the operating body above the screen.

The display unit 30 may be, for example, a display device such as a liquid crystal display (LCD) device and an organic light emitting diode (OLED) display device. The display unit 30 may operate in accordance with control of the display control unit 103 to present the display screen to the user.

The operation detection unit 101 has a function of detecting operations input by a user based on input signals input from the operation unit 20. For example, the operation detection unit 101 may detect an operation of setting and changing the display area to be displayed on the screen within a predetermined image. For example, operations detected by the operation detection unit 101 may include a selection operation, a scroll operation, an enlargement operation, a reduction operation, a display area move operation, and so forth. The operation detection unit 101 may input information of the detected operation to the display control unit 103. When the user performs the operation using the touch sensor on the operation screen displayed on the display unit 30, the input signal is input to the operation detection unit 101 by the operation unit 20. The operation detection unit 101 may detect a location of the operating body based on the input signal. Operations that may be input on the respective operation screens and motions to be carried out by the operations are present in a corresponding way on the operation screen operated by the user. The operation detection unit 101 may refer to the operation information corresponding to the operation screen and determine a type of the operation input from a transition of the detected location of the operating body O. The operation detection unit 101 may input the operation information including the type of detected operation and the operation location to the display control unit 103.

The display control unit 103 has a function of controlling motions of the display unit 30. The display control unit 103 may control motions of the display unit 30 based on the operation information input from the operation detection unit 101. The display control unit 103 may determine the display area of the image based on the operation information input from the operation detection unit 101. The display control unit 103 may then control displaying the plurality of images such that the display area set within the image is displayed within the display screen for each of the images to be displayed within the display screen among the plurality of images. In this case, the display control unit 103 may cause the display area portion of the image to be enlarged and displayed within the display screen.

The storage unit 105 is a unit for storing data, and may include a storage medium, a recording device recording data on the storage medium, a reading device reading data from the storage medium, a removal device for removing data recorded on the storage medium, and so forth. Here, for example, a non-volatile memory such as a flash memory, a magnetoresistive random access memory (MRAM), a ferroelectric random access memory (FeRAM), a phase change random access memory (PRAM), and an electronically erasable and programmable read only memory (EEPROM), or a magnetic recording medium such as a hard disk drive (HDD) may be employed as the storage medium. For example, the storage unit 105 may store programs for controlling actions of the display control device 10a or various data. In addition, the storage unit 105 may store content data including the plurality of enlarged images generated by the output unit 107.

The output unit 107 has a function of outputting the plurality of enlarged images as data different from the original data (the plurality of images that are not enlarged) based on the operation information output from the operation detection unit 101. For example, when depression of a button displayed in the display screen is detected, the output unit 107 may output the plurality of enlarged images at the time that the corresponding button is depressed. Data that is output at this time may be, for example, data that is cut and enlarged from the display area portion. Alternatively, data that is output at this time may be data of which the location information of the display area and the image correspond to each other. The output unit 107 may output the plurality of images in a form including information required to enlarge and display the same display area as that output when the plurality of images are displayed next time.

An example of the function of the display control device 10a according to the present embodiment has thus been described. Each of the components described above may be configured using a general purpose member or circuit and may also be configured using hardware dedicated to the function of each component. In addition, the function of each component may be carried out by reading a control program that has described a procedure realizing the function of each component from a storage medium such as ROM or RAM and analyzing and executing the control program using a processor such as a central processing unit (CPU). It is thus possible to change the configuration to be employed as appropriate in response to the current technology level at which the present embodiment is embodied.

In addition, it is possible to create a computer program for realizing each function of the display control device 10a as described above and mount the program on a personal computer or the like. In addition, a recording medium that has the computer program stored therein and is readable by a computer may also be provided. The recoding medium, for example, may be a magnetic disk, an optical disc, a magneto-optical disc, a flash memory, and so forth. In addition, the computer program may be distributed, for example, through the network without using the recording medium.

(1-2. Display Control)

Figure 3:
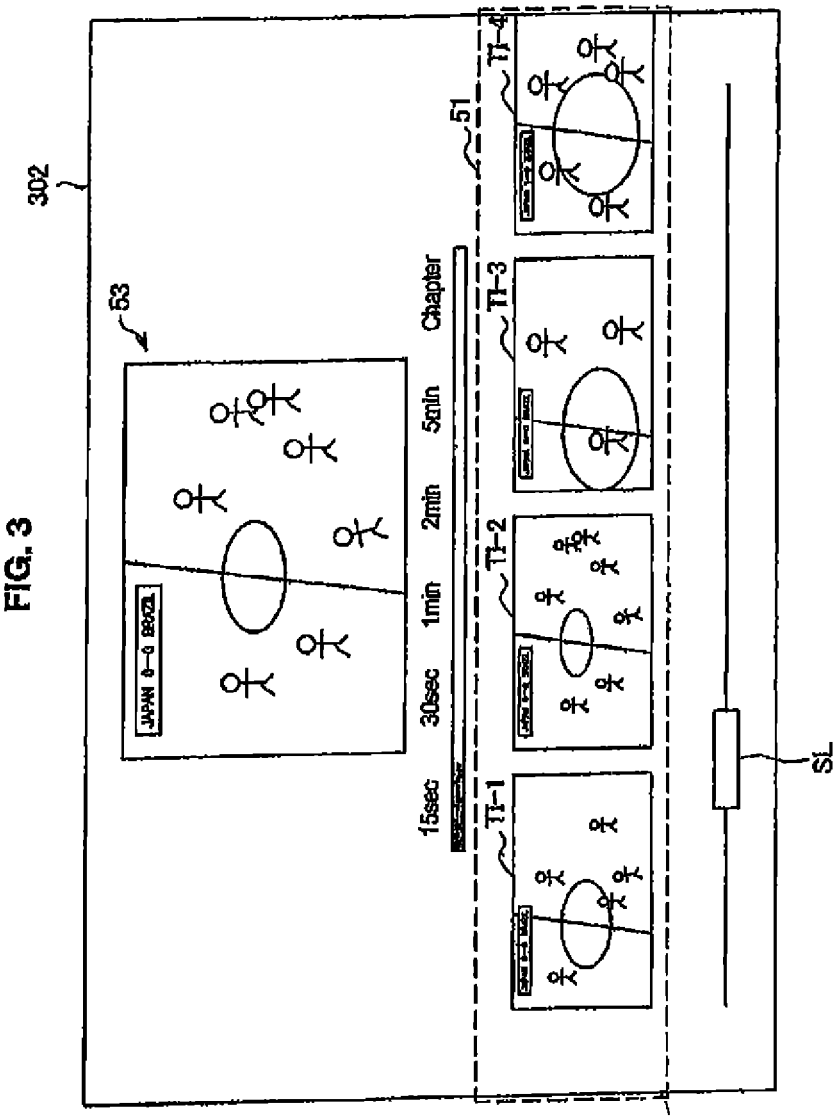
FIG. 3 is a diagram illustrating an example of a display screen displayed by a display control device according to the first embodiment.
Figure 4:
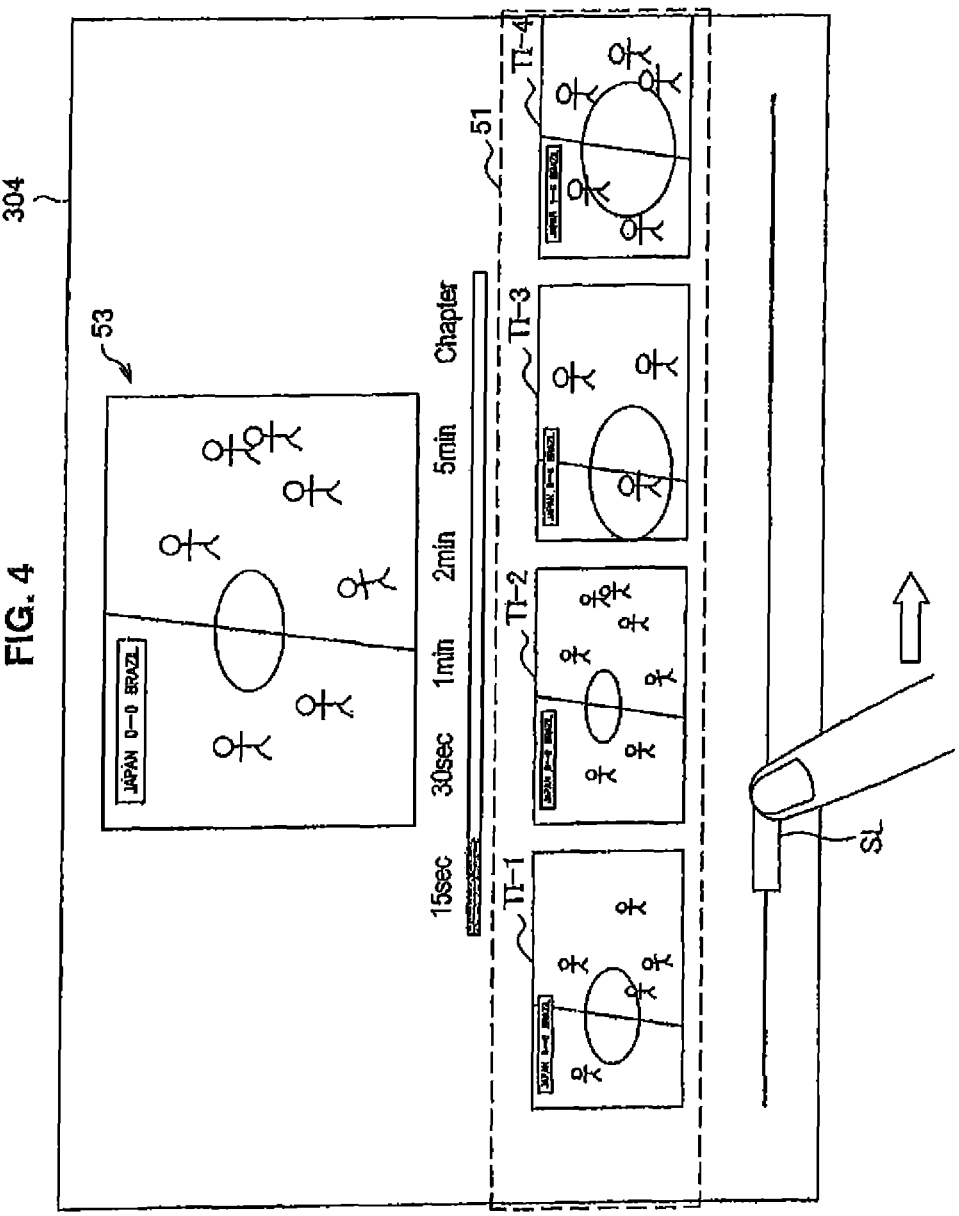
FIG. 4 is a diagram illustrating an example of an operation on a display screen displayed by a display control device according to the first embodiment.
Figure 5:
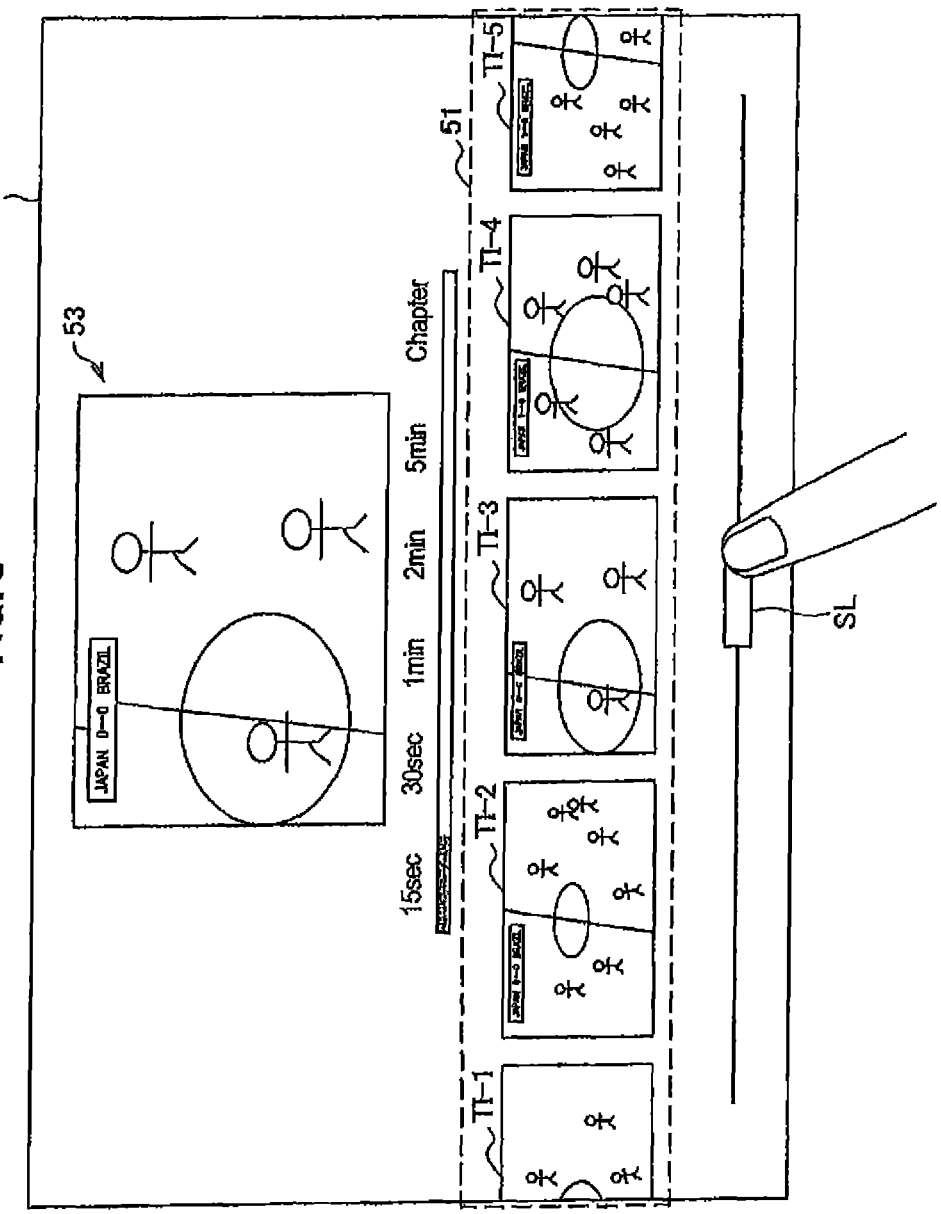
FIG. 5 is a diagram illustrating an example of a display screen after an operation of FIG. 4.
Figure 6:
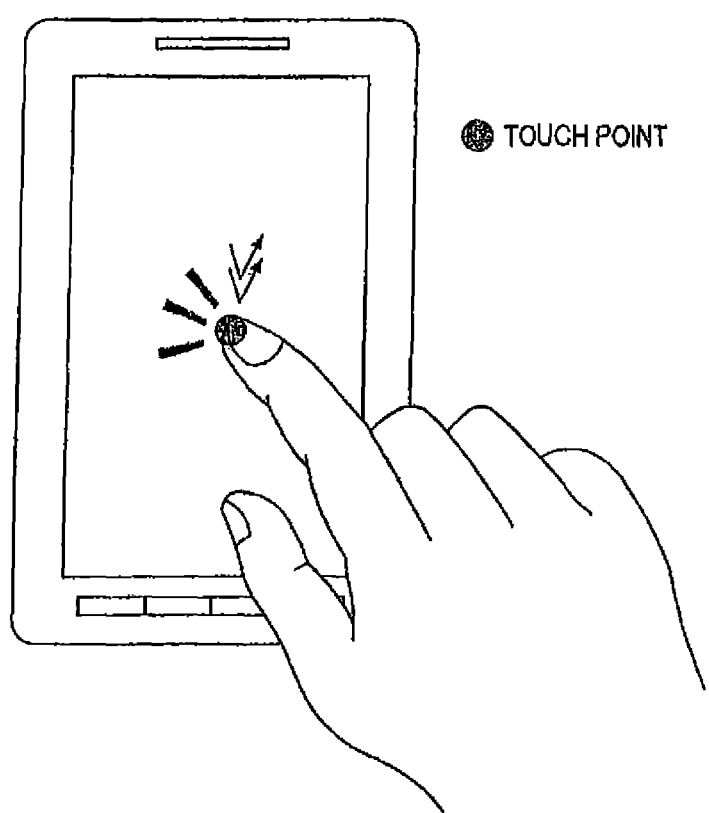
FIG. 6 is a diagram illustrating an example of an enlargement operation (double-tap)
Figure 7:
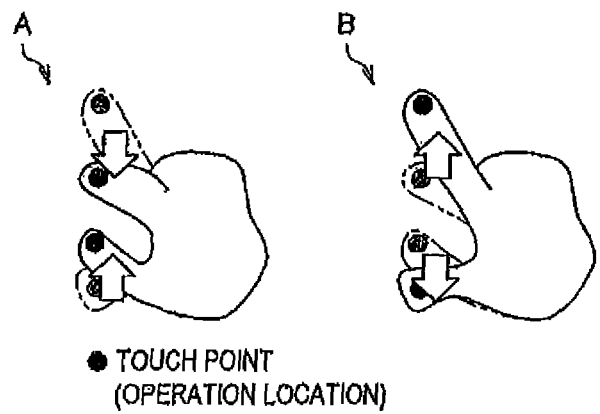
FIG. 7 is a diagram illustrating an example of enlargement and reduction operations (pinch-in, pinch-out)
Figure 8:
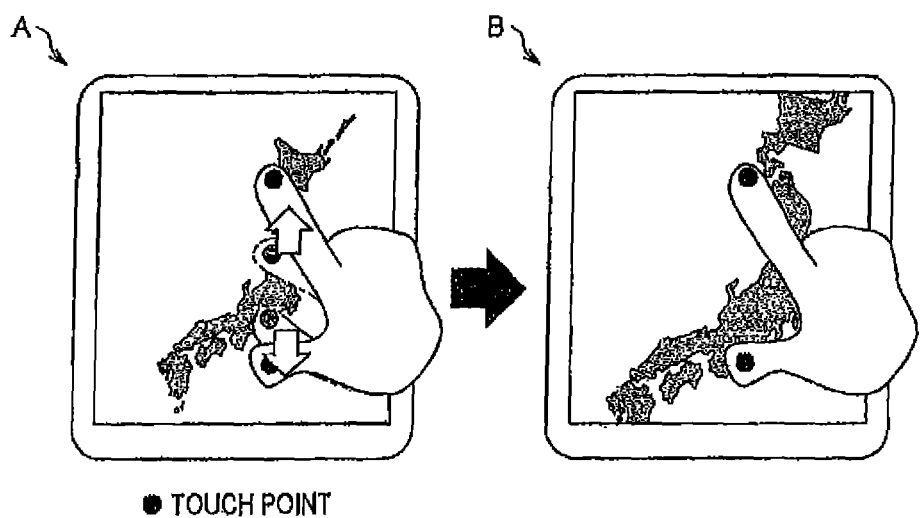
FIG. 8 is a diagram illustrating an example of a display screen when an enlargement operation (pinch-in) has been carried out.
Figure 9:
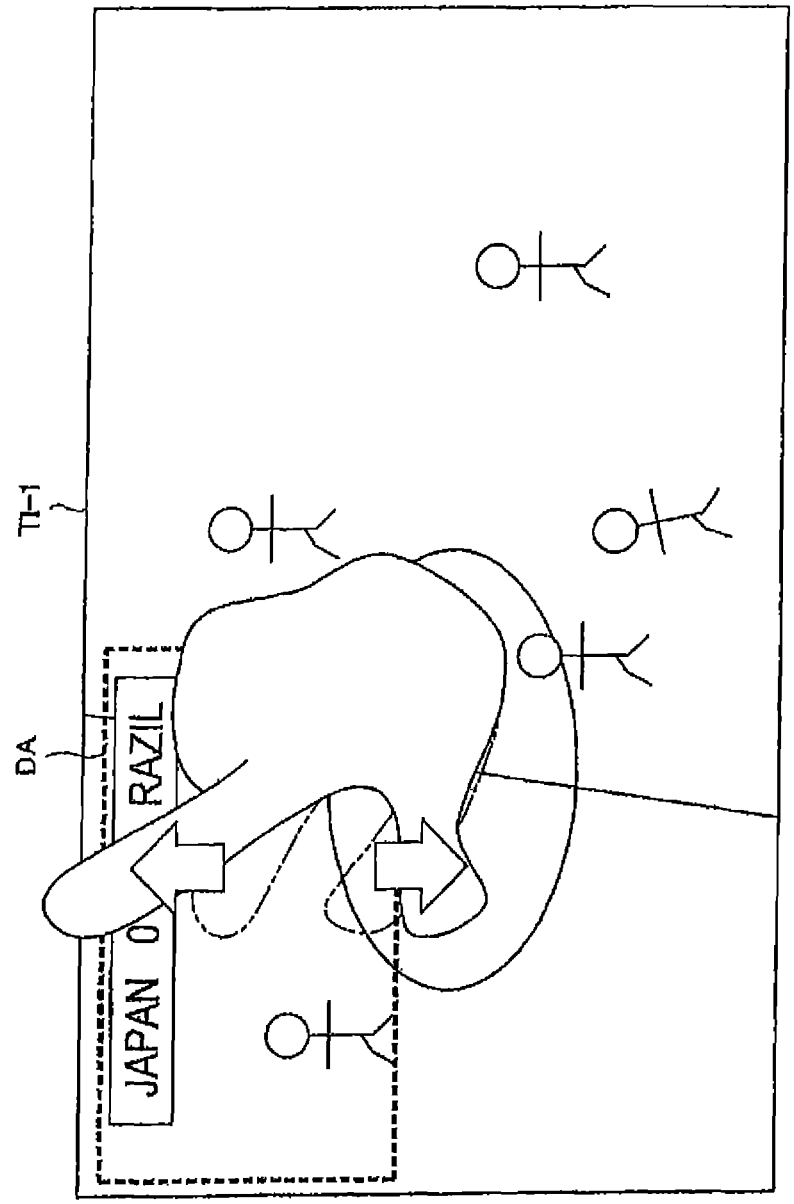
FIG. 9 is a diagram illustrating an enlargement operation on a thumbnail image displayed by a display control device according to the first embodiment.
Figure 10:
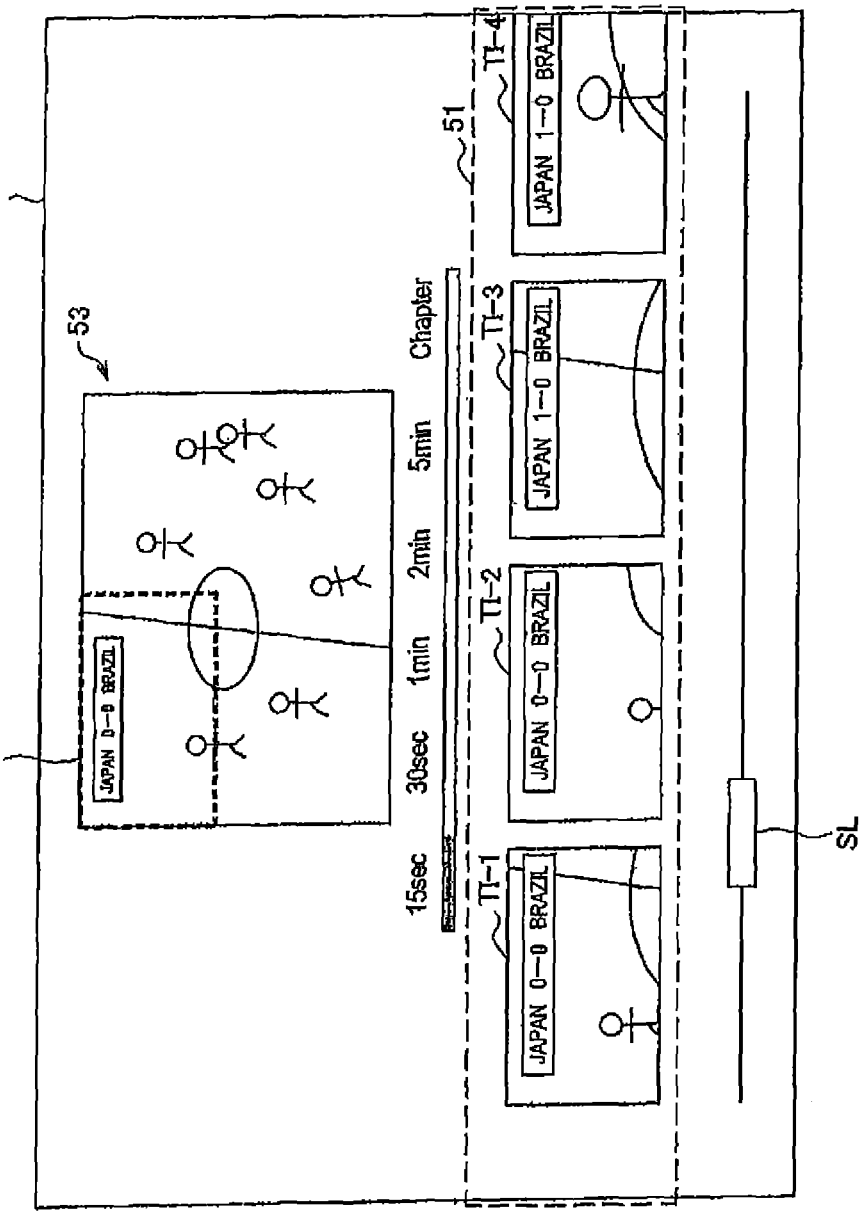
FIG. 10 is a diagram illustrating an example of a display screen displayed by a display control device according to the first embodiment after an enlargement operation.
Figure 11:
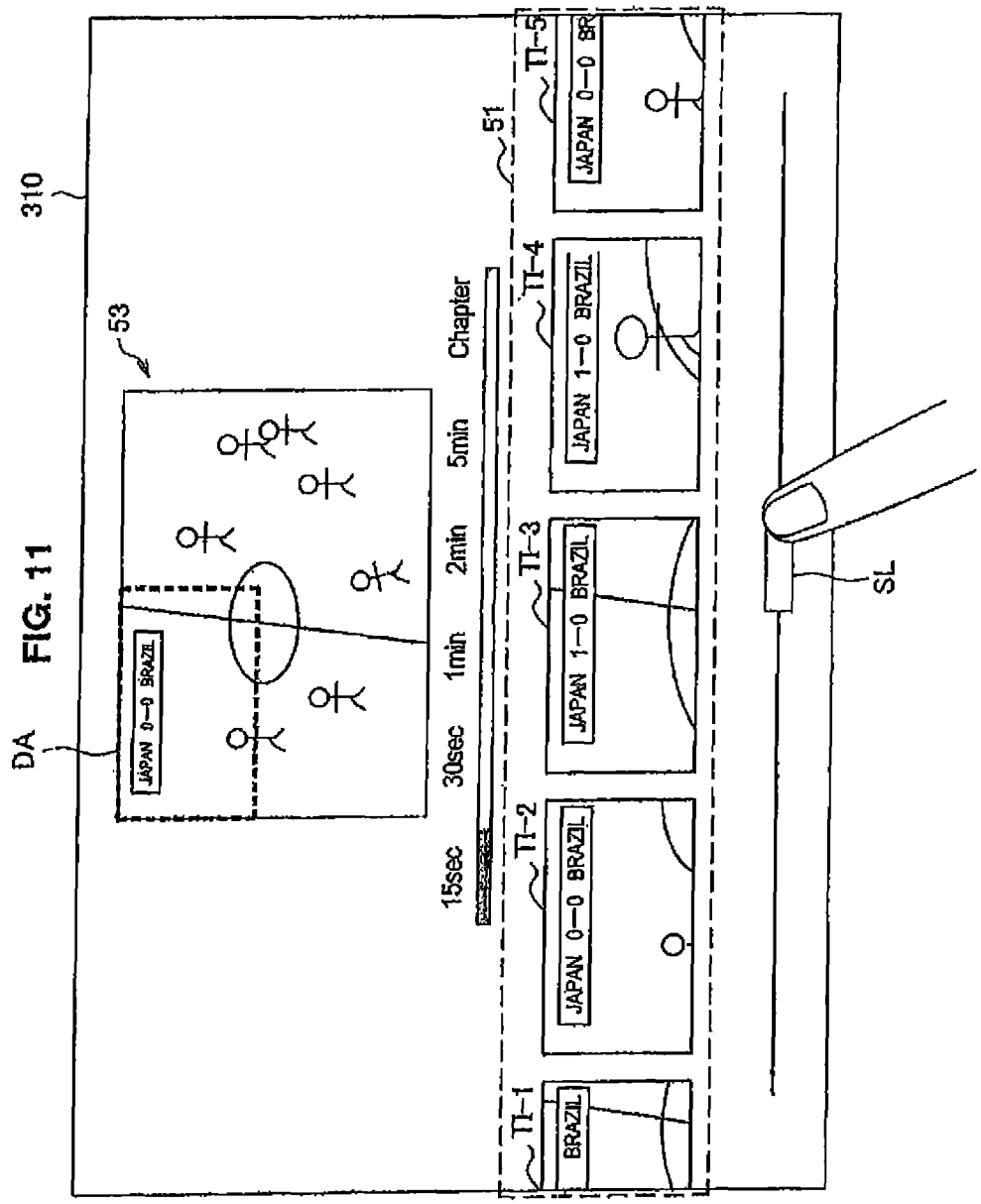
FIG. 11 is a diagram illustrating an example of a display screen displayed by a display control device according to the first embodiment when a scroll operation is carried out after an enlargement operation.
Figure 12:
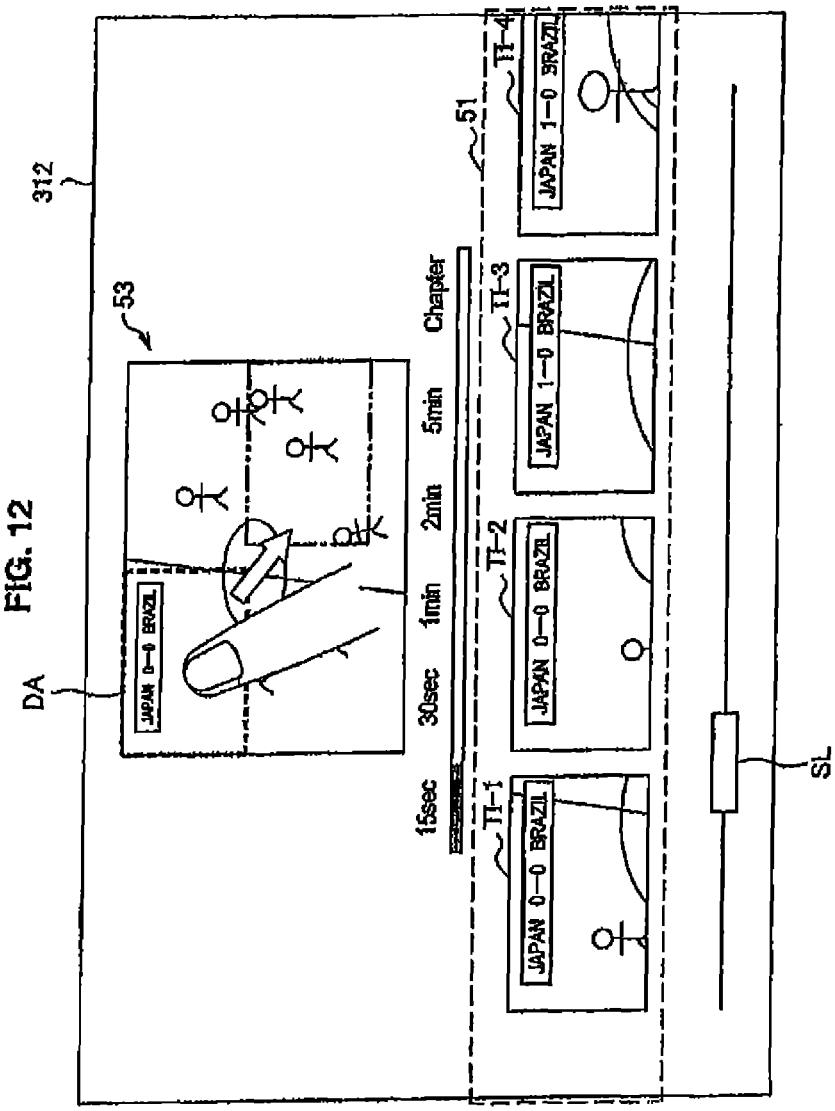
FIG. 12 is a diagram illustrating a display area move operation on a display screen displayed by a display control device according to the first embodiment.
Figure 13:
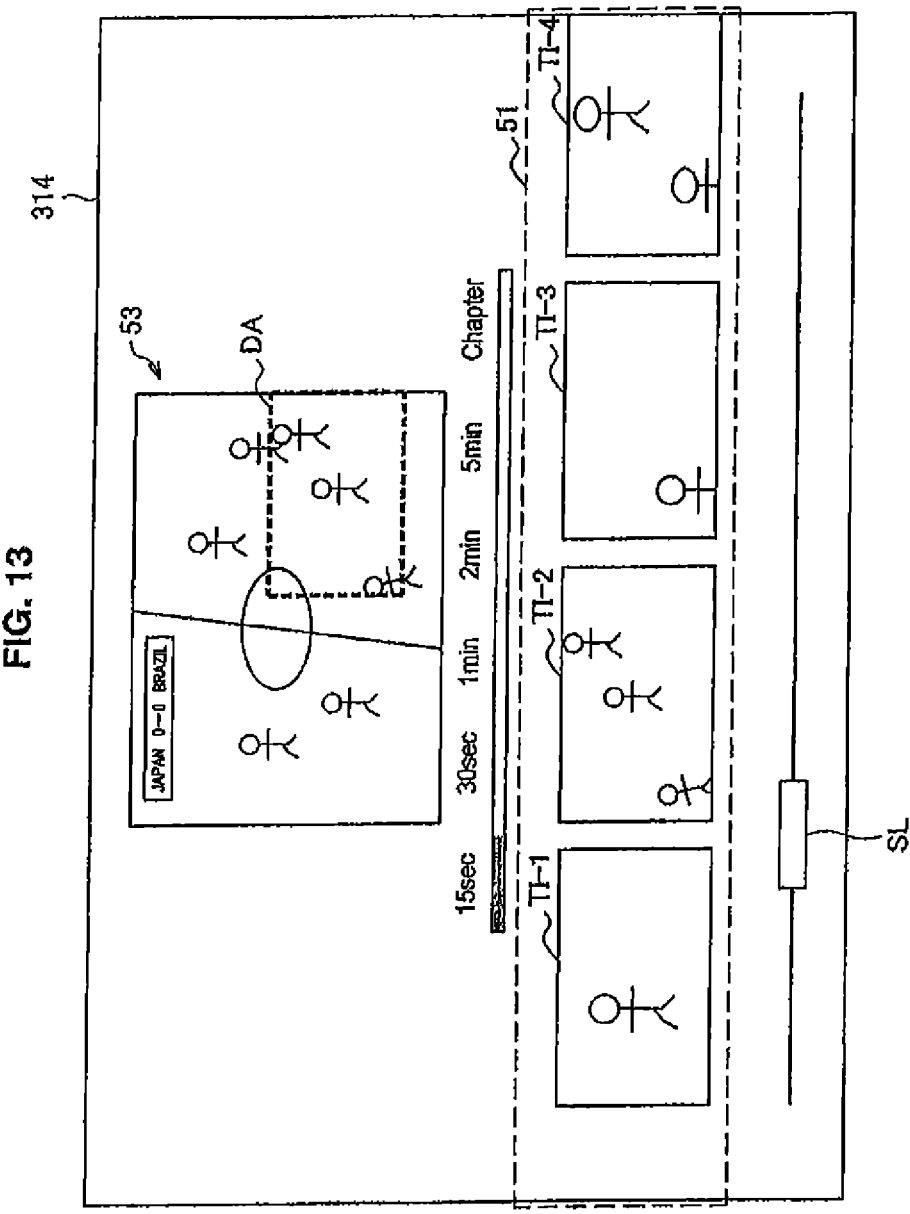
FIG. 13 is a diagram illustrating an example of a display screen displayed by a display control device according to the first embodiment after the display area move operation shown in FIG. 12.
Figure 14:
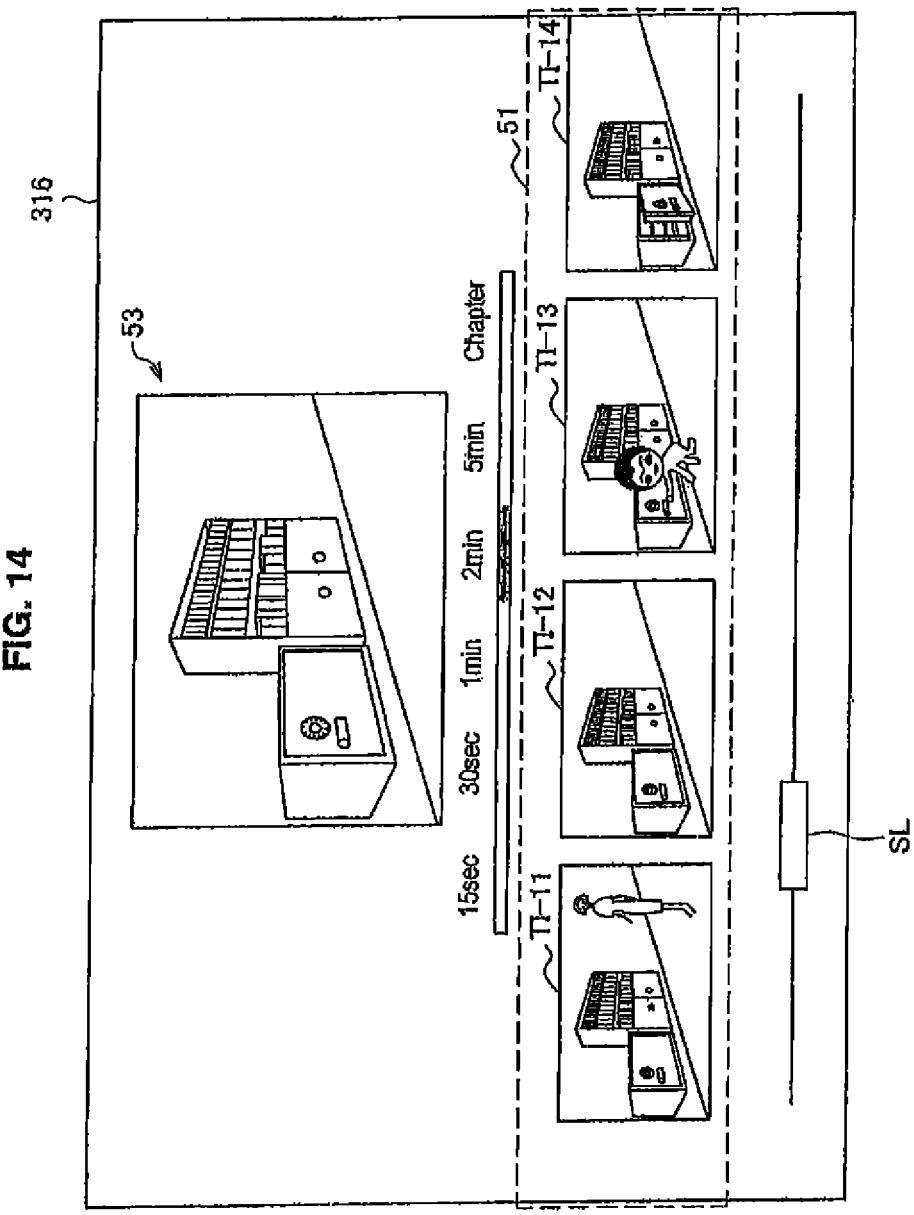
FIG. 14 is a diagram illustrating an example of a display screen displayed by a display control device according to the first embodiment when a moving image of a security camera is displayed.
Figure 15:
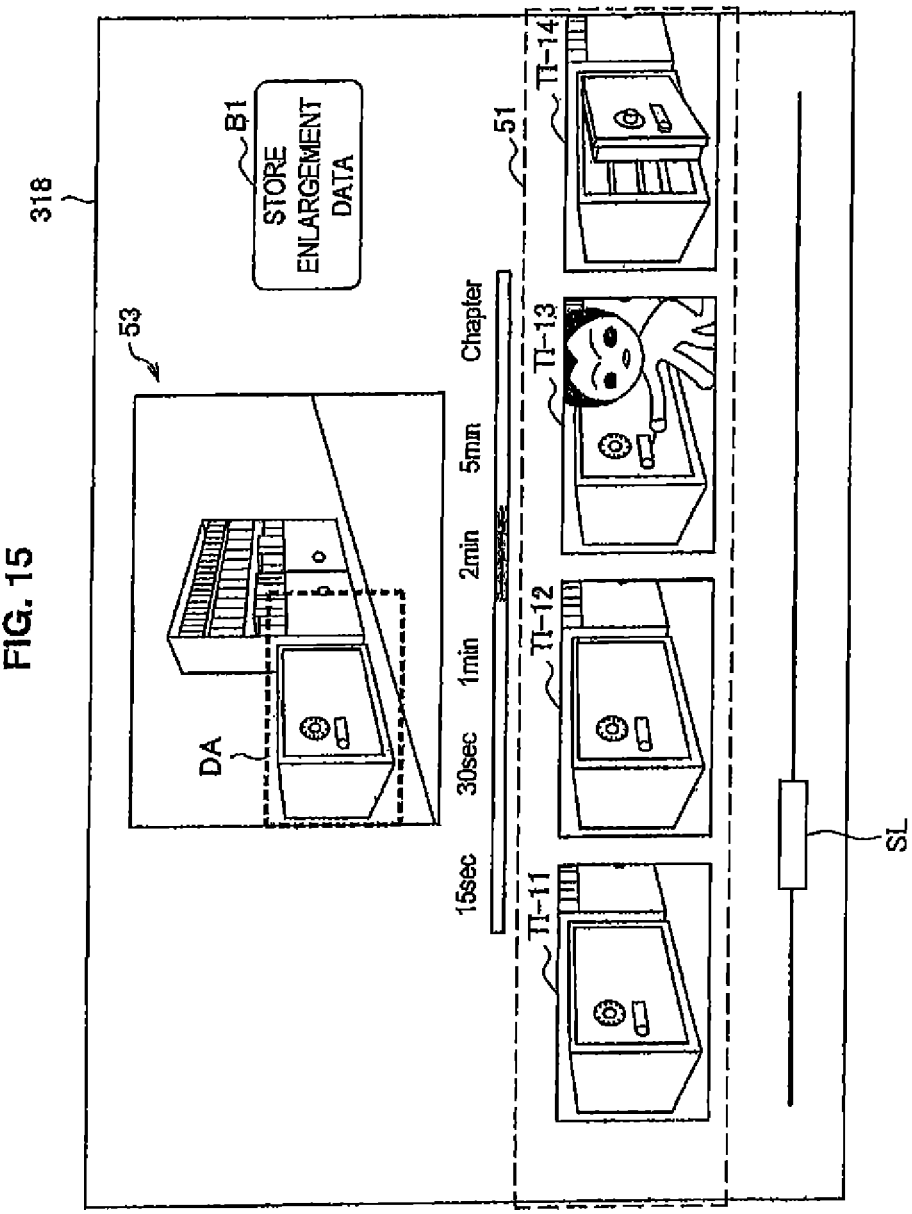
FIG. 15 is a diagram illustrating an example of a display screen displayed by a display control device according to the first embodiment after an enlargement operation on the display screen of FIG. 14 is carried out.

Next, specific examples of the display control according to the present embodiment will be described with reference to FIGS. 3 to 15. FIG. 3 is a diagram illustrating an example of a display screen displayed by a display control device according to the first embodiment. FIG. 4 is a diagram illustrating an example of an operation on a display screen displayed by a display control device according to the first embodiment. FIG. 5 is a diagram illustrating an example of a display screen after an operation of FIG. 4. FIG. 6 is a diagram illustrating an example of an enlargement operation (double-tap). FIG. 7 is a diagram illustrating an example of enlargement and reduction operations (pinch-in, pinch-out). FIG. 8 is a diagram illustrating an example of a display screen when an enlargement operation (pinch-in) has been carried out. FIG. 9 is a diagram illustrating an enlargement operation on a thumbnail image displayed by a display control device according to the first embodiment. FIG. 10 is a diagram illustrating an example of a display screen displayed by a display control device according to the first embodiment after an enlargement operation. FIG. 11 is a diagram illustrating an example of a display screen displayed by a display control device according to the first embodiment when a scroll operation is carried out after an enlargement operation. FIG. 12 is a diagram illustrating a display area move operation on a display screen displayed by a display control device according to the first embodiment. FIG. 13 is a diagram illustrating an example of a display screen displayed by a display control device according to the first embodiment after the display area move operation shown in FIG. 12. FIG. 14 is a diagram illustrating an example of a display screen displayed by a display control device according to the first embodiment when a moving image of a security camera is displayed. FIG. 15 is a diagram illustrating an example of a display screen displayed by a display control device according to the first embodiment after an enlargement operation on the display screen of FIG. 14 is carried out.

First, referring to FIG. 3, an example of the display screen displayed by the display control device 10 according to the present embodiment is shown. Here, an example of which the display control unit 103 causes a plurality of thumbnail images on which a soccer game has been recorded to be displayed on the display screen 302 by scrolling will be described.

The display screen 302 may include, for example, a plurality of thumbnail images Ti in a first display field 51. In FIG. 3, four images of the thumbnail images TI-1 to TI-4 are displayed. Hereinafter, the thumbnail images may be distinguished between the thumbnail image TI-1, thumbnail image TI-2, and so forth as necessary. However, when it is not necessary to particularly distinguish between the thumbnail images, the thumbnail images are denoted with the same reference TI. For example, when it is not necessary to particularly distinguish between the thumbnail image TI-1, the thumbnail image TI-2, and so forth, the thumbnail images are simply referred to as a thumbnail image TI. The thumbnail image TI, for example, may be an image that is displayed every predetermined time interval such as 5 seconds, 30 seconds, 1 minute, 2 minutes, 5 minutes, or the like. Alternatively, the thumbnail image TI may be an image at the time of start point of each chapter. For example, here, the thumbnail image TI is displayed every 15 seconds. In addition, the thumbnail image TI displayed in the first display field 51 may be a still image and may also be a moving image of a predetermined period that is repeatedly reproduced. For example, among the thumbnail images TI displayed in the first display field 51, the thumbnail image TI displayed at a location near the center of the screen may be a moving image and the other thumbnail images are still images.

In addition, the display screen 302 may include a second display field 53 in which any one of the thumbnail images TI is displayed to be larger than the thumbnail images TI displayed in the first display field 51. The image displayed in the second display field 53, for example, may be a thumbnail image TI displayed at a location near the center among the thumbnail images TI displayed in the first display field 51. The image displayed in the second display field 53 may also be changed when the thumbnail image displayed in the center of the first display field 51 is changed. In addition, the display screen 302 may include a scroll bar that scrolls the display of the thumbnail image TI.

Next, referring to FIGS. 4 and 5, how the scroll operation is carried out is illustrated. As shown in FIG. 4, the scroll operation may be performed by carrying out a so-called drag operation of moving the slider SL of the scroll bar included in the display screen 302 while the scroll bar is selected and then carrying out a so-called drop operation of taking off the slider SL at the destination as shown in FIG. 5.

Here, an enlargement operation carried out by the user will be described with reference to FIGS. 6 to 8. FIG. 6 illustrates a first example of the enlargement operation. For example, the user may enlarge and display the desired location by carrying out a double-tap operation of tapping the operation screen of the display control unit 10*a* twice in succession. For example, at this time, the display control unit 103 may control the display using a predetermined enlargement ratio centered on a touch point of the double-tap operation.

Alternatively, as shown in A of FIG. 7, when the user carries out an operation of narrowing an interval between two touch points using two fingers (pinch-out operation), the display control unit 103 may reduce and display the display screen. At this time, the display control unit 103 may determine the location of the reduced display area based on the location of the touch points, and may determine the reduction ratio in response to the amount of change in interval between the touch points. In addition, as shown in B of FIG. 7, when the user carries out an operation of increasing the interval between two touch points using two fingers (pinch-in operation), the display control unit 103 may cause the display screen to be enlarged and displayed. At this time, the display control unit 103 may determine the location of the enlarged display area based on the location of the touch points, and may determine the enlargement ratio in response to the amount of change in interval between the touch points.

For example, FIG. 8 illustrates the state before and after the enlargement operation. As shown in FIG. 8, the display control unit 103 may cause the image of the display area determined based on the location of the touch points and the amount of change in interval between the touch points to be enlarged and displayed.

Here, the process returns to the display screen 302 of FIG. 3 again. The user carries out the enlargement operation on any (in this case, the thumbnail image TI-1) of the thumbnail images T1 displayed in the first display field 51 of the display screen 302. For example, the enlargement operation may be carried out by carrying out the pinch-in operation on the thumbnail image TI-1 displayed in the first display field 51 as shown in FIG. 9. The display control unit 103 determines the display area DA based on the pinch-in operation.

The display screen 308 after the enlargement operation is carried out is illustrated in FIG. 10. A portion corresponding to the display area is displayed in the thumbnail image TI to be displayed in the first display field 51 in the display screen 308. The display area is a portion of the thumbnail image TI-1 determined based on the enlargement operation as described above. Here, the size of the area for displaying one image of the first display field 51 has a predetermined value. The display control unit 103 may cause a portion of the thumbnail image TI to be enlarged and displayed such that the size of the display area DA portion is equal to the predetermined size. In addition, the display control unit 103 may cause a portion corresponding to the display area DA determined in the thumbnail image TI-1 to be enlarged and displayed for a portion of each of the thumbnail image TI-2, the thumbnail image TI-3, and the thumbnail image TI-4.

When the user carries out the enlargement operation on any of the thumbnail images TI displayed within the display screen, for example, the thumbnail image TI-1, the enlarged thumbnail image TI-1 is enlarged to display the display area determined based on the enlargement operation. In addition, a portion corresponding to the display area of the thumbnail image TI-1, is enlarged and displayed for each of the thumbnail image TI-2, the thumbnail image TI-3, and the thumbnail image TI-4.

In addition, the display area DA may be displayed overlapping the image displayed in the second display field 53. By means of the display, the user may understand what portion of the image is enlarged at the current point of time.

In addition, the display screen 310 on which the scroll operation is carried out on the first display field 51 in the enlarged display screen 308 is illustrated in FIG. 11. The display control unit 103 controls the display such that a portion of the thumbnail image TI-1, which is newly displayed in response to the scroll operation and corresponds to the display area of the thumbnail image TI-1, is also enlarged and displayed.

In addition, the user may carry out an operation of changing the display area DA, for example, a move operation. Referring to FIG. 12, the user may move the display area DA by carrying out a drag-and-drop operation on the display area DA portion on the image displayed in the second display field 53. When the user carries out the move operation, the thumbnail image TI of which the moved display area DA portion is enlarged is displayed in the first display field 51 as shown in FIG. 13. In addition, aside from the example that the display area DA is changed, a further enlargement operation, a reduction operation, and so forth may be employed.

As described above, according to the display control device 10*a* of the present embodiment, when the user carries out the enlargement operation on any one of the displayed images, the corresponding display area DA portion is enlarged and displayed without carrying out the enlargement operation on each of the plurality of display images. In addition, a portion of the plurality of thumbnail images TI included in the content is displayed in the first display field 51 within the display screen. When the operation of changing the thumbnail image TI to be displayed among the plurality of thumbnail images Ti included in the content is carried out, a portion corresponding to the display area DA in the thumbnail image TI newly displayed in response to the change operation is also enlarged and displayed. An example of the operation of changing the thumbnail image TI to be displayed may include an operation of changing extraction conditions of the thumbnail image TI aside from the scroll operation described with reference to FIG. 11. For example, when the change operation is carried out such that the thumbnail image TI displayed every 15 seconds is changed to be displayed every 1 minute, a portion corresponding to the display area DA in the thumbnail image TI newly displayed in response to the change operation is also enlarged and displayed.

The user can thus enlarge the same location of each of the plurality of thumbnail images TI using the enlargement operation one time. As in the example described herein, it is possible to more efficiently find the portion at which the score changes in the program on which the soccer game is recorded by enlarging and displaying the score display portion.

The same location of each of the images may be focused and seen when the desired image among the plurality of images is found. For example, a moving image of a fixed point camera may be exemplified as another example of focusing and seeing the same location of each of the images.

Here, an example in which the display control device 10*a* according to the present embodiment causes the moving image of the fixed point camera, that is, a moving image of a security camera, to be displayed will be described with reference to FIGS. 14 and 15. It is assumed that an unusual event has occurred at a safe that is continuously recorded by the security camera. When the point of time at which the unusual event that occurred at the safe is specified, it is necessary to check the image of the security camera focused on a portion near the safe. Here, when the display control device 10a described above is employed, the display screen 316 of FIG. 14 is enlarged, and thus the enlarged display screen 318 displays a plurality of enlarged thumbnail images T1 enlarged in the first display field 51 as shown in FIG. 15. In addition, the display screen 318 may include a button B1 for storing data after enlargement. When the user operates the button B1, it is possible to store the data of the display area portion at the point of time at which the operation started as data separate from the original data. In addition, although the button B1 is illustrated herein, the present technology is not limited thereto, but may employ other operations corresponding to the operation of storing the enlarged image. For example, depression of the button installed on a main body of the display control device 10a, selection of a menu displayed by depressing the button installed on the main body of the display control device 10a, and so forth may be employed as the other operations.

2. Second Embodiment

Figure 16:
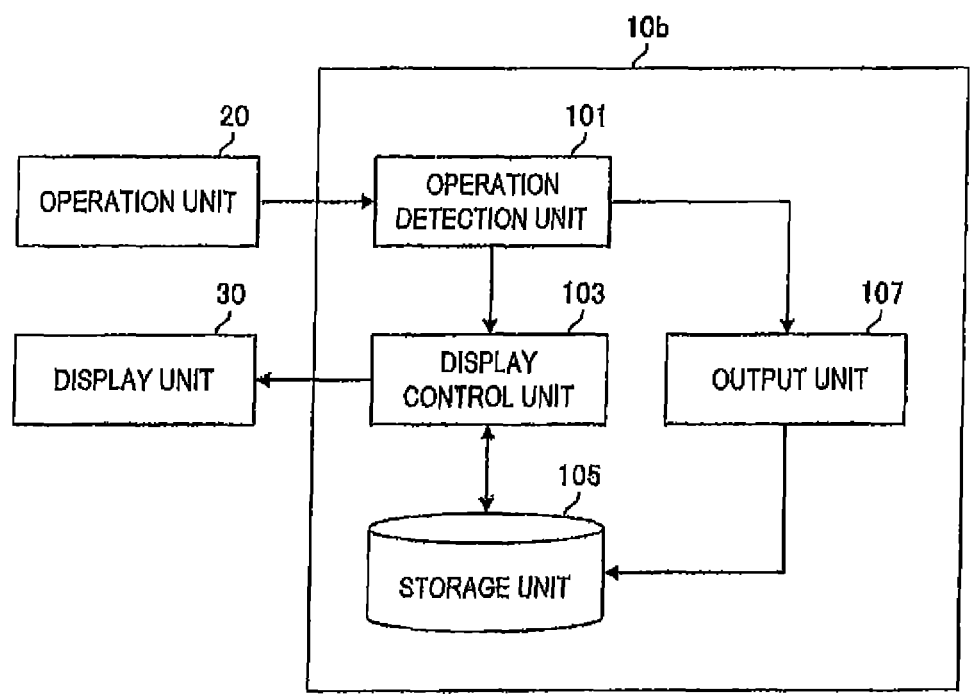
FIG. 16 is a diagram illustrating a functional block diagram of a display control device according to a second embodiment of the present technology.
Figure 17:
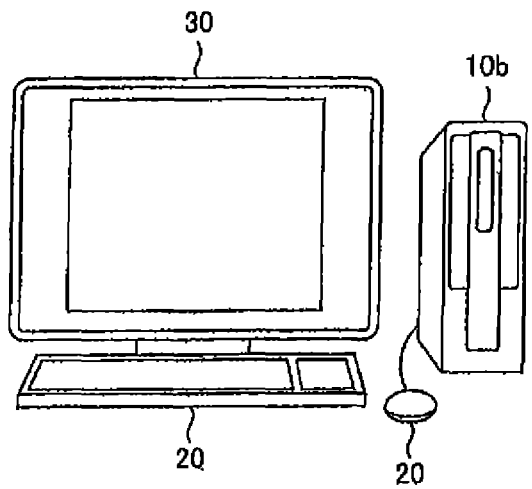
FIG. 17 is a diagram illustrating an appearance example of a display control device according to the second embodiment.

Next, the display control device controlling the display based on the input operation from an external input device will be described with reference to FIGS. 16 and 17. FIG. 16 is a diagram illustrating a functional block diagram of a display control device according to the second embodiment of the present technology. FIG. 17 is a diagram illustrating an appearance example of the display control device according to the second embodiment.

The display control device 10b according to the second embodiment of the present technology mainly includes an operation detection unit 101, a display control unit 103, a storage unit 105, and an output unit 107. The display control device 10b according to the second embodiment differs from the display control device 10a according to the first embodiment in that the operation unit 20 and the display unit 30 are not present.

For example, the display control device 10b having a functional configuration as shown in FIG. 16 is an information processing device such as a desktop type PC shown in FIG. 17. In this case, among a display, a keyboard, and a mouse connected to the main body of the PC serving as the display control device 10b, the display corresponds to the display unit 30, and the keyboard corresponds to the operation unit 20. The display control device 10b is not limited to the PC. For example, the display control device 10b may be a gaming machine. In this case, the operation unit 20 is a controller of the gaming machine.

The function of each component shown herein is the same as that of the display control device 10a according to the first embodiment of the present technology, and thus the repeated description is omitted. In addition, the display control device 10a according to the first embodiment detects the location on the screen at which the operation is carried out by the operating body O and then detects the operation information based on the location of the operating body, whereas the display control device 10b, for example, operates the location of the pointer on the screen using the mouse and may thus detect the operation information based on the location information of the pointer.

An example of the function of the display control device 10b according to the present embodiment is thus described. Each component described above may be configured using a general purpose member or circuit or may also be configured using hardware dedicated to the function of each component. In addition, the function of each component may be carried out by reading a control program that has described a procedure realizing the function of each component from a storage medium such as ROM or RAM and analyzing and executing the control program using a processor such as a CPU. It is thus possible to change the configuration to be employed as appropriate in response to the current technology level at which the present embodiment is embodied.

In addition, it is possible to create a computer program for realizing each function of the display control device 10b according to the present embodiment as described above and mount the program on a personal computer or the like. In addition, a recording medium that has the computer program stored therein and is readable by a computer may also be provided. The recoding medium, for example, is a magnetic disk, an optical disc, a magneto-optical disc, a flash memory, and so forth. In addition, the computer program described above may be distributed, for example, through the network without using the recording medium.

In addition, in the embodiments described above, the display control device 10a having the built-in operation unit 20 and the display unit 30 is described in the first embodiment. In addition, the display control device 10b connected to the external operation unit 20 and the external display unit 30 is described in the second embodiment. However, the present technology may be applied to not only the examples described above but also various types of the information processing devices. For example, either of the operation unit 20 and the display unit 30 may be built in and the other may be installed externally.

3. Hardware Configuration Example

Next, an example of hardware configurations of the display control device 10 according to the first and second embodiments of the present technology described above will be described with reference to FIG. 18. FIG. 18 is a diagram illustrating an example of hardware configurations of the display control device according to the first and second embodiments of the present technology.

For example, the function of each component of the display control device 10 described above may be embodied using the hardware configuration shown in FIG. 18. That is, the function of each component is realized by controlling the hardware shown in FIG. 18 using the computer program. In addition, the type of the hardware is arbitrary, for example, may include a handheld terminal such as a personal computer, a cellular phone, a PHS, a PDA, a gaming machine, or various information appliances. Note that "PHS" refers to a personal handy-phone system. In addition, "PDA" is an abbreviation for "personal digital assistant."

As shown in FIG. 18, the hardware mainly includes a CPU 902, a Rom 904, a RAM 906, a host bus 908, and a bridge 910. In addition, the hardware includes an external bus 912, an interface 914, an input unit 916, an output unit 918, a storage unit 920, a drive 922, a connection port 924, and a communication unit 926. Note that "CPU" is an abbreviation for "central processing unit." In addition, "ROM" is an abbreviation for "read only memory." "RAM" is an abbreviation for "random access memory."

For example, the CPU 902 acts as a processor or a control device, and controls all or some of actions of the respective components based on various programs recorded on the ROM 904, the RAM 906, the storage unit 920, or the removable recording medium 928. The ROM 904 acts to store programs read in the CPU 902 or data used for the operation, and so forth. For example, the program read in the CPU 902 or various parameters that are properly changed to execute the program are stored temporarily or persistently in the RAM 906.

For example, these components are connected to each other through the host bus 908 in which data may be transmitted at a high speed. Meanwhile, the host bus 908 is connected to the external bus 912 in which data is transmitted at a relatively low speed through the bridge 910, for example. In addition, the input unit 916 may employ, for example, a mouse, a keyboard, a touch panel, a button, a switch, a lever, and so forth. In addition, the input unit 916 may employ a remote controller (hereinafter referred to as a remote) capable of transmitting control signals using infrared light or other radio waves.

The output unit 918 is, for example, a display device such as a CRT, an LCD, a PDP, or an ELD, an audio output device such as a speaker or a headphone, or a device capable of visually or aurally informing the user of acquired information such as a printer, a mobile phone, or a facsimile. Note that "CRT" is an abbreviation for "cathode ray tube." In addition, "LCD" is an abbreviation for "liquid crystal display." "PDP" is an abbreviation for "plasma display panel." In addition, "ELD" is an abbreviation for "electro-luminescence display."

The storage unit 920 is a device for storing various data. The storage unit 920, for example, may employ a magnetic storage device such as a hard disk drive (HDD), a semiconductor storage device, an optical storage device, or a magneto-optical storage device. Note that "HDD" is an abbreviation for "hard disk drive."

For example, the drive 922 is a device that reads information recorded on the removable recording medium 928 such as a magnetic disk, an optical disc, a magneto-optical disc, or a semiconductor memory or writes information on the removable recording medium 928. For example, the removable recording medium 928 may include DVD media, Blu-ray media, HD DVD media, or various semiconductor storage media. For example, the removable recording medium 928 may employ an IC card on which a non-contact type IC chip is mounted, or an electronic apparatus. Note that "IC" is an abbreviation for "integrated circuit."

For example, the connection port 924 is a USB port, an IEEE 1394 port, a SCSI, an RS-232C port, or a port to be connected to an external connection apparatus 930 such as an optical audio terminal. For example, the external connection apparatus 930 is a printer, a portable music player, a digital camera, a digital moving image camera, or an IC recorder. Note that "USB" is an abbreviation for "universal serial bus." In addition, "SCSI" is an abbreviation for "small computer system interface."

The communication unit 926 is a communication device to be connected to the network 932, and is, for example, a communication card for wired or wireless LAN, Bluetooth (registered trademark), or WUSB, a router for optical communication, a router for ADSL, a modem for various communication, and so forth. In addition, the network 932 connected to the communication unit 926 is configured by a network connected in a wired or wireless manner, and is, for example, the Internet, a domestic LAN, infrared communication, visible light communication, or satellite communication. Note that "LAN" is an abbreviation for "local area network." In addition, "WUSB" is an abbreviation for "wireless USB." "ADSL" is an abbreviation for "asymmetric digital subscriber line."

In addition, the hardware configuration described above is an example. The display control device 10 may have a configuration in which some of the configuration shown in FIG. 18 is omitted. In addition, the display control device 10 may be configured to further include a configuration that is not included as shown in FIG. 18. Alternatively, the display control device 10 may be configured such that some of the configuration shown in FIG. 18 is replaced with other configurations.

It should be understood by those skilled in the art that various modifications, combinations, sub-combinations and alterations may occur depending on design requirements and other factors insofar as they are within the scope of the appended claims or the equivalents thereof.

For example, although thumbnail images of the one moving image content and thumbnail images of the moving image of the fixed point camera are described as an example of the plurality of images having a predetermined relation in the embodiments described above, the present technology is not limited to the example above. For example, the plurality of images having the predetermined relation may be a plurality of images collected in response to the same theme.

In addition, the configurations below are also included in the technical scope of the present technology.

(1) A display control device including:
an operation detection unit configured to detect an enlargement operation on any image displayed within a display screen among a plurality of images having a predetermined relation; and
a display control unit configured to determine a display area of the image based on the detected enlargement operation and to cause a portion corresponding to the display area to be enlarged and displayed for each of the images displayed within the display screen.

(2) The display control device according to (1), wherein the plurality of images are scroll-displayed side by side, and the display control unit also causes the portion corresponding to the display area to be enlarged and displayed with respect to an image displayed within the display screen among the plurality of images in response to a scroll operation after the enlargement operation is detected.

(3) The display control device according to (1) or (2), wherein the operation detection unit further detects a change operation of changing the display area, and the display control unit controls displaying the plurality of images such that the image within the display area of which location is changed based on the change operation is displayed within the display screen for each of the images displayed within the display screen.

(4) The display control device according to (3), wherein the change operation includes a move operation of moving the display area, and the display control unit controls displaying the plurality of images such that the image within the display area of which the location is changed based on the move operation is displayed within the display screen for each of the images displayed within the display screen.

(5) The display control device according to (3) or (4), wherein the change operation includes a reduction operation on any image of the plurality of images, and the display control unit controls displaying the plurality of images such that the image within the display area of which the size is changed based on the reduction operation is displayed within the display screen for each of the images displayed within the display screen.

(6) The display control device according to any one of (1) to (5), further including:
an output unit configured to output the plurality of enlarged images as data different from the plurality of images that are not enlarged.

(7) The display control device according to any one of (1) to (6), wherein the plurality of images are a plurality of thumbnail images in one moving image content.
(8) The display control device according to any one of (1) to (7), wherein the plurality of images are a plurality of images captured by a fixed point camera.
(9) A display control method including:
  detecting an enlargement operation on any image displayed within a display screen among a plurality of images having a predetermined relation; and
  determining a display area of the image based on the detected enlargement operation, and causing a portion corresponding to the display area to be enlarged and displayed for each of the images displayed within the display screen.
(10) A program causing a computer to act as a display control device including:
  an operation detection unit configured to detect an enlargement operation on any image displayed within a display screen among a plurality of images having a predetermined relation; and
  a display control unit configured to determine a display area of the image based on the detected enlargement operation and to cause a portion corresponding to the display area to be enlarged and displayed for each of the images displayed within the display screen.

The present disclosure contains subject matter related to that disclosed in Japanese Priority Patent Application JP 2011-125417 filed in the Japan Patent Office on Jun. 3, 2011, the entire content of which is hereby incorporated by reference.

What is claimed is:

1. A non-transitory computer-readable medium for use with a processor included in an apparatus, wherein the computer-readable medium is encoded with instructions which, when executed by the processor, cause the apparatus to:
  display plural thumbnail images that are included as frames within a first moving image that is stored on a recording medium, the plural thumbnail images being displayed along a predetermined direction on a display;
  scroll the plural thumbnail images in response to a drag operation in which an operating body is moved along the display in the predetermined direction, the moving operating body being detected by a touch sensor on the display;
  display, in a designated display field, successive frames corresponding to the thumbnail images as the thumbnail images are scrolled, at least one frame displayed in the designated field being displayed in an enlarged format that is larger than the displayed plural thumbnail images in response to a pinch operation by the operating body on the touch sensor, with an enlargement ratio determined in response to an amount of change of the operating body; and
  store a second moving image based on the designated display field, wherein the second moving image is stored separately from the first moving image.

2. The medium of claim 1, in which the processor displays a slider and the thumbnail images are scrolled by operation of the slider.

3. The medium of claim 1, wherein the pinch operation comprises movement of two elements of the operating body; and in which the processor causes the apparatus to display the at least one selected thumbnail image in the designated display field as an enlarged thumbnail image based on separation of the two elements.

4. The medium of claim 1, wherein the pinch operation is a pinch-out or pinch-in operation and the designated display field is positioned at a location based on the location of touch points of the pinch-out or pinch-in operation and the enlargement ratio is determined in response to an amount of change in interval between the touch points.

5. A method for controlling a display of moving images, comprising:
  displaying plural thumbnail images that are included as frames within a first moving image that is stored on a recording medium, the plural thumbnail images being displayed along a predetermined direction on a display;
  scrolling the plural thumbnail images by moving an operating body along the display in the predetermined direction, the moving operating body being detected by a touch sensor on the display;
  displaying, in a designated display field, successive frames corresponding to the thumbnail images as the thumbnail images are scrolled, at least one frame displayed in the designated field being displayed in an enlarged format that is larger than the displayed plural thumbnail images in response to a pinch operation by the operating body on the touch sensor, with an enlargement ratio determined in response to an amount of change of the operating body; and
  storing a second moving image based on the designated display field, wherein the second moving image is stored separately from the first moving image.

6. The method of claim 5, further comprising displaying a slider and operating the slider to scroll the thumbnail images.

7. The method of claim 5, wherein the pinch operation comprises moving two elements of the operating body; and the at least one selected thumbnail image is displayed as an enlarged thumbnail image based on separation of the two elements.

8. The method of claim 5, wherein the pinch operation is a pinch-out or pinch-in operation and the designated display field is positioned at a location based on the location of touch points of the pinch-out or pinch-in operation and the enlargement ratio is determined in response to an amount of change in interval between the touch points.

9. An information processing apparatus for controlling a display of moving images, comprising:
  a display including a touch sensor configured to detect a moving operating body on the display;
  a processor configured (a) to cause plural thumbnail images that are included as frames within a first moving image that is stored on a recording medium to be displayed along a predetermined direction on the display, (b) to cause the plural thumbnail images to be scrolled in response to a drag operation of the operating body along the display in the predetermined direction and (c) to cause successive frames corresponding to the thumbnail images to be displayed, in a designated display field on the display, as the thumbnail images are scrolled, at least one frame displayed in the designated field being displayed in an enlarged format that is larger than the displayed plural thumbnail images in response to a pinch operation by the operating body on the touch sensor, with an enlargement ratio determined in response to an amount of change of the operating body; and
  a store for storing a second moving image based on the designated display field, wherein the second moving image is stored separately from the first moving image.

10. The information processing apparatus of claim 9, wherein the display displays a slider and the thumbnail images are scrolled by operation of the slider.

11. The information processing device of claim 9 wherein the pinch operation comprises movement of two elements of the operating body; and in which the processor causes the display to display the at least one thumbnail image in the designated display field as an enlarged thumbnail image based on separation of the two elements.

12. The information processing device of claim 9, wherein the pinch operation is a pinch-out or pinch-in operation and the designated display field is positioned at a location based on the location of touch points of the pinch-out or pinch-in operation and the enlargement ratio is determined in response to an amount of change in interval between the touch points.

* * * * *